July 29, 1958  R. E. GREENE, JR  2,845,024
SAFETY ARMING DEVICE

Filed Jan. 8, 1953  2 Sheets-Sheet 1

INVENTOR
ROBERT E. GREENE JR.

BY

ATTORNEYS

July 29, 1958  R. E. GREENE, JR  2,845,024
SAFETY ARMING DEVICE
Filed Jan. 8, 1953  2 Sheets-Sheet 2
FIG.3.
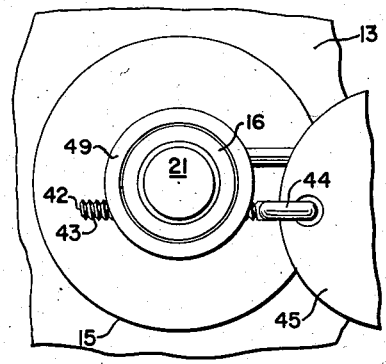
FIG.4.
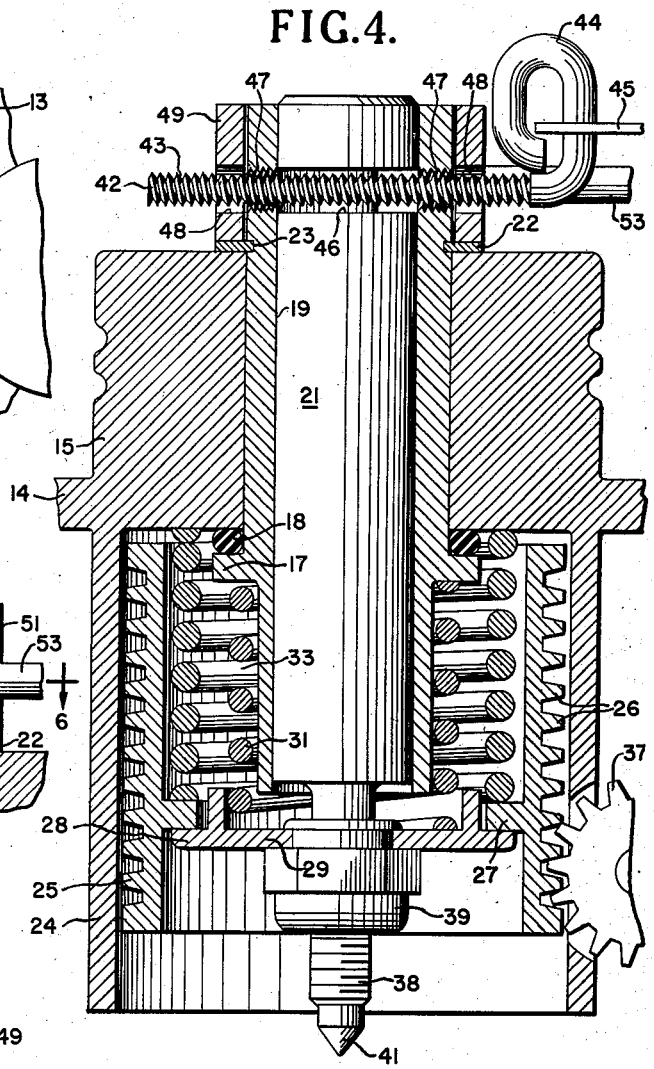
FIG.5.
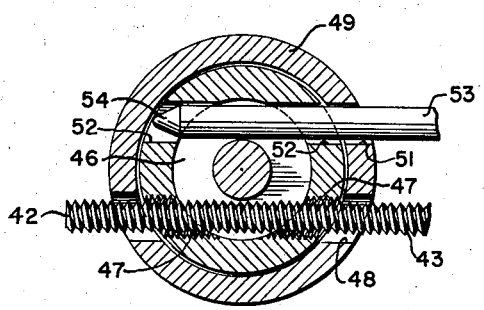
FIG.6.
INVENTOR
ROBERT E. GREENE JR.
BY
ATTORNEYS

United States Patent Office 2,845,024
Patented July 29, 1958

2,845,024

SAFETY ARMING DEVICE

Robert E. Greene, Jr., Silver Spring, Md., assignor to the United States of America as represented by the Secretary of the Navy Application January 8, 1953, Serial No. 330,367

3 Claims. (Cl. 102—4)

(Granted under Title 35, U. S. Code (1952), sec. 266)

The invention described herein may be manufactured and used by or for the Government of the United States of America for governmental purposes without the payment of any royalties thereon or therefor.

The present invention relates to an apparatus for ensuring the proper sequence of operation during the removal of a safety pin and the insertion of an arming wire of a time delay control unit for releasing the cover of a parachute pack or for performing other such operations in ordnance devices.

Prior art control units have had no provision for ensuring such proper sequential operation, thus, the safety pin may be removed prior to insertion of the arming wire which causes the device to arm prematurely resulting in improper operation of the unit.

In the device of the present invention a safety pin is provided which cannot be removed without exerting great force until the arming wire is inserted whereupon resistance to the removal of the safety pin is reduced permitting withdrawal thereof.

An object of the present invention is to provide new and improved apparatus for preventing premature arming of a control unit for ordnance devices by resisting removal of a safety pin from the unit until such resistance has been released by the insertion of an arming wire in the unit.

Another object is to provide new and improved apparatus for retaining the safety pin of an ordnance device against removal until an arming wire has been inserted in the device thus to ensure proper operation of the device.

Still another object is to provide apparatus for the control unit of an ordnance device wherein safety to personnel and proper sequential operation of the unit is assured.

Other objects and many of the attendent advantages of this invention will be readily appreciated as the same becomes better understood by reference to the following detailed description when considered in connection with the accompanying drawings wherein:

Fig. 3 is a plan view of the device of the present invention and showing the safety pin and the arming wire inserted therein;

Fig. 4 is an enlarged vertical sectional view of the device and showing the respective positions of the components and the safety pin when the arming wire is inserted;

Fig. 5 is a view similar to Fig. 4 and showing the respective positions of the components and the arming wire; and, Fig. 6 is a sectional view taken along the line 6—6 of Fig. 5 and showing the safety pin free for withdrawal therefrom.

Figure 1:
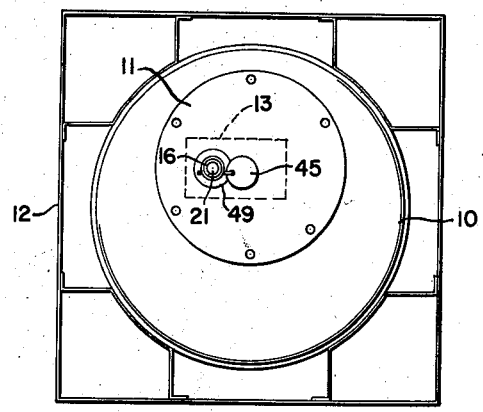
Fig. 1 is a rear elevation of a parachute pack showing a control unit mounted therein.
Figure 2:
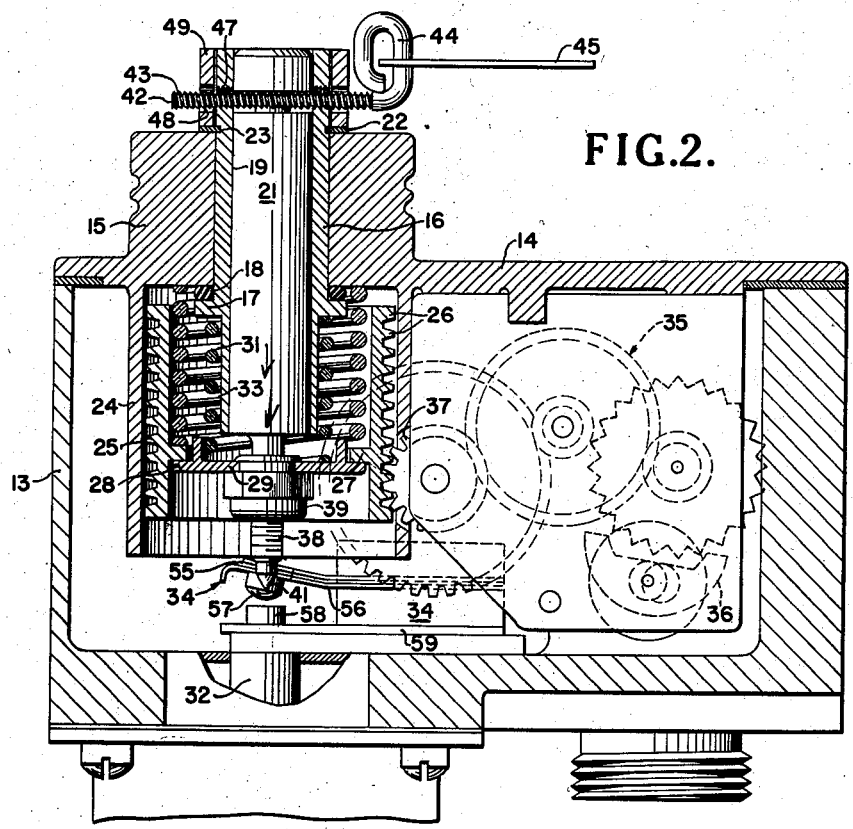
Fig. 2 is a sectional view of the control unit and showing the device of the present invention applied thereto.

Referring more particularly to the drawings wherein like numerals indicate like parts throughout the several views, 10 indicates generally a parachute pack in which the control device 11 is mounted. Pack 10 is provided in the present case with a fin structure 12. Control device 11 is provided with a mechanical delay switch having a casing 13 fitted with a cover 14 which has formed thereon a collar 15. Fixedly mounted in collar 15 is a tubular member 16 having a flange 17 formed thereon for preventing movement thereof in an outward direction and having an O-ring gasket 18 interposed between the flange 17 and the inner side of cover 14. Bore 19 of member 16 receives slidably a firing pin 21. Tubular member 16 is held against movement in an inward direction by locking ring 22 which is mounted in groove 23 of member 16 as clearly shown in Fig. 2.

Cover 14 is provided with a tubular portion 24 extending inwardly therefrom and in axial alignment with collar 15 and coaxial with pin 21 and tubular member 16. Slidably mounted in portion 24 is a cylindrical rack 25 having circumferential gear teeth 26 formed on the outer surface thereof. An inwardly extending circumferential flange 27 is formed on the inner surface of rack 25 and engages the flange 28 of a spring cup 29 secured to the inner end of pin 21. Interposed between flange 17 of tubular member 16 and spring cup 29 is a helical spring 31 which exerts a force to move pin 21 toward a primer 32 as will be hereinafter more fully described. A second helical spring 33 of larger diameter than spring 31 is mounted between the inner face of cover 14 and flange 27 of rack 25 and exerts a force to move rack 25 in a direction toward switch 34 mounted interiorly of the time delay switch casing 13.

A gear train 35 is mounted in casing 13 and has incorporated therein an escapement mechanism or other retarding apparatus 36. Pinion 37 of gear train 35 meshes with teeth 26 of rack 25.

Spring cup 29 is adjustably secured on reduced threaded end 38 of pin 21 by a lock nut 39 of any suitable variety. The extreme end 41 of pin 21 is pointed to ensure penetration of the primer 32 thereby.

In order to maintain pin 21 in an armed position and to retain springs 31 and 33 in the compressed condition thereof a safety pin 42 is provided, pin 42 being provided with threads 43 along the length thereof and an eye 44 at one end thereof for receiving an instruction tag 45.

Firing pin 21 is provided with a circumferential groove 46 of sufficient size to receive pin 42 therein. Tubular member 16 has formed therein a pair of threaded aligned bores 47, the threads being of the same number per inch as the threads of pin 42 and of a diameter to permit pin 42 to pass freely therethrough without rotation. Pin 42 also passes through smooth bores 48 of annular member 49 which is sleeved about the outer end of tubular member 16. Annular member 49 is also provided with a slot 51 aligned with the other side of groove 46 of firing pin 21 and a pair of bores 52 in tubular member 16. Bores 52, slot 51 and the other side of groove 46 of firing pin 21 are adapted to receive an arming wire 53 having a tapered end 54.

As shown in Fig. 4 pin 42 is urged in a direction toward cover 14 by the wall of groove 46 in pin 21 which in turn is urged inwardly by the high tension of springs 31 and 33. Threads 43 of pin 42 rest in one side of threaded bores 47 thus locking and preventing removal of safety pin 42 by the usual method of hand withdrawal until the arming wire 53 is inserted through slot 51 and bores 52. Bores 52 are slightly offset with respect to groove 46 of pin 21 to cause a camming action as the tapered end 54 of arming wire 53 contacts and passes through groove 46 thus lifting pin 21 against the tension of springs 31 and 33, releasing tension on safety pin 42 and centering the pin 42 in threaded bores 47, thus freeing safety pin 42 for easy withdrawal from the device.

It will be noted that annular member 49 is not provided with a corresponding slot opposite slot 51. This is to prevent arming wire 53 from passing completely through the bores and into the usual armed position thereof until safety pin 42 is removed from bores 48 in annular member 49. After pin 42 is withdrawn, annular member 49 is free to be removed from tubular member 16. When member 49 is removed, arming wire 53 is forced through bores 52 and groove 46 until a required length of the free end thereof has passed therethrough.

From the foregoing it is clear that there has been provided an apparatus for preventing withdrawal of safety pin 42 until arming wire 53 has been inserted thus preventing premature operation of a parachute pack cover release circuit. When the mine is released from an aircraft, arming wire 53 is withdrawn causing firing pin 21 to strike primer 32, the primer causing a source of electrical energy (not shown) to be activated. When firing pin 21 is released, rack 25 is released thereby and is retarded in its movement toward switch 34 by gear train 35 and escapement 36 to provide a predetermined time delay between activation of the energy source and closing of switch 34. Switch 34 is closed as rack 25 approaches the end of its movement, finger 55 of leaf spring 56 being engaged by the rack 25 thus causing contact 57 thereof to engage contact 58 of fixed arm 59 of the switch. When the contacts 57 and 58 engage, the circuit for releasing the cover of the parachute pack is energized thus releasing the cover.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. In an arming device, a fixed member, a movable member slidably mounted in said fixed member, a transverse bore in said fixed member, a safety pin freely received in said bore, spring means biasing said movable member for movement in one direction, means on said movable member engaged by said pin for preventing movement of said movable member in said one direction, interlocking means on said pin and on said fixed member and adapted to be engaged by the biasing action of the spring means for preventing withdrawal of said pin, means including an arming wire insertable in said fixed member and engageable with said means on said movable member for movement of said movable member in a direction opposite to said one direction for disengaging said interlocking means and releasing said pin for withdrawal thereof, insertion of said arming wire serving to prevent movement of the movable member by said spring means until the arming wire is withdrawn, and a removable annular member sleeved about said fixed member and engageable by said pin to prevent removal of the annular member, said annular member having means for preventing complete insertion of the arming wire until said pin is withdrawn.

2. In an arming device, a casing having a fixed tubular member secured through a wall thereof, a cylindrical firing pin slidably mounted in said fixed member and having a retracted position and a firing position, a transverse threaded bore and a smooth bore in said fixed member, a threaded safety pin extending through said threaded bore, the internal diameter of said threaded bore being greater than the external diameter of said safety pin whereby the safety pin is adapted to be freely movable in the threaded bore, means on said firing pin engageable by said safety pin to prevent movement of said firing pin from the retracted position thereof, means for yieldably urging said firing pin in one direction whereby a biasing effect is exerted on said safety pin and the threads of said safety pin lockingly engage the threads of said threaded bore, and an arming wire insertable in said smooth bore and engageable with said firing pin, insertion of said arming wire serving to move said firing pin and relieve the biasing effect exerted on said safety pin whereby the safety pin is freely movable for withdrawal from said threaded bore.

3. In an arming device, a tubular member, a firing pin slidably mounted in said tubular member, means for urging said firing pin from a retracted position to a firing position, a transverse threaded bore in said tubular member, a threaded safety pin extending through said bore, the diameter of said safety pin being less than the internal diameter of said threaded bore, the threads of the safety pin and the bore being of the same pitch, said firing pin being formed with a circumferential groove and thereby providing a shoulder on said firing pin in engagement with said safety pin, said firing pin having a biasing effect on said safety pin so that the threads of the safety pin and the threads of the bore interengage to prevent withdrawal of the safety pin, a second bore in said tubular member for receiving an arming wire, said second bore having the axis thereof offset with respect to the axis of said first bore whereby the biasing effect of the firing pin on the safety pin is relieved as the arming wire engages the shoulder of said firing pin to permit withdrawal of the safety pin.

References Cited in the file of this patent

UNITED STATES PATENTS 2,393,861    Miller    Jan. 29, 1946